United States Patent [19]

Kobayashi et al.

[11] Patent Number: 5,477,356
[45] Date of Patent: Dec. 19, 1995

[54] INJECTION METHOD FOR A LIQUID CRYSTAL DISPLAY WITH A SINGLE ORIENTATION SURFACE

[75] Inventors: Shunsuke Kobayashi, Tokyo; Yasuo Toko, Yokohama, both of Japan

[73] Assignee: Stanley Electric Co., Ltd., Tokyo, Japan

[21] Appl. No.: 23,197

[22] Filed: Feb. 25, 1993

[30] Foreign Application Priority Data

Mar. 4, 1992 [JP] Japan ...................... 4-047322

[51] Int. Cl.⁶ ...................... G02F 1/1335; G02F 1/1337; G02F 1/13
[52] U.S. Cl. .................. 359/62; 359/78; 359/102
[58] Field of Search ................... 359/62, 76, 78, 359/80, 102

[56] References Cited

U.S. PATENT DOCUMENTS 5,237,440  8/1993  Watanabe et al. ............... 359/90

FOREIGN PATENT DOCUMENTS

| 61-179419 | 8/1986 | Japan . | |
|---|---|---|---|
| 62-80624 | 4/1987 | Japan . | |
| 62-226126 | 10/1987 | Japan . | |
| 63-256922 | 10/1988 | Japan | 359/62 |
| 1300223 | 12/1989 | Japan | 359/62 |
| 2273718 | 11/1990 | Japan | 359/62 |

OTHER PUBLICATIONS

DeZwart et al., "Electric Field–Induced . . . Anisotropy", physics letters, vol. 55A, No. 1, Nov. 1975, pp. 41–42.
Patent Abstracts of Japan, vol. 016, No. 216 (P-1356) 21 May 1992 & JP-A-04 039 627 (Sanyo Chem. Ind. Ltd.) 10 Feb. 1992.

*Primary Examiner*—William L. Sikes
*Assistant Examiner*—Ron Trice
*Attorney, Agent, or Firm*—Frishauf, Holtz, Goodman, Langer & Chick

[57] ABSTRACT

A method of manufacturing a liquid crystal display, includes the steps of: forming thin film transistors TFTs, pixel electrodes connected to the TFTs, and electrode lines connected to the TFTs, respectively on a surface of a first substrate; forming a common electrode on a surface of a second substrate which is not subjected to any orientation process, the first substrate having no orientation means; forming an orientation film on the common electrode on the second substrate and performing a rubbing process only on the orientation film on the second substrate wherein the first substrate is not subjected to a rubbing process; disposing the first and second substrates to face each other and to be spaced apart from each other by a predetermined distance, and injecting a nematic liquid crystal material that is in an isotropic phase thereof, which is heated to at least a phase transition temperature that provides an isotropic phase of said liquid crystal material, said liquid crystal material being injected in between the first and second substrates; and gradually cooling the heated liquid crystal material to a temperature at which the isotropic phase changes to a nematic liquid crystal phase. Cooling occurs in a direction from the second substrate toward the first substrate.

6 Claims, 3 Drawing Sheets

INJECTION METHOD FOR A LIQUID CRYSTAL DISPLAY WITH A SINGLE ORIENTATION SURFACE

BACKGROUND OF THE INVENTION

1. Field of the Invention

The present invention relates to a liquid crystal display, and more particularly to a liquid crystal display with less defects during manufacturing processes.

2. Description of the Related Art

FIG. 3 is a cross sectional view of a thin film transistor (TFT) type liquid crystal display manufactured by a conventional method.

Referring to FIG. 3, a twist nematic type liquid crystal cell is constructed Of liquid crystal molecules 30 having longitudinal axes orientated in parallel to the surfaces of two transparent glass substrates, the longitudinal axes being twisted by 90 degrees in the range between one substrate and the other substrate. The liquid crystal layer 31 is retained between the two transparent glass substrates 32 and 33 facing each other and spaced by a predetermined distance by a spacer (not shown).

Formed on the lower glass substrate 32 shown in FIG. 3 are TFTs 34 for applying an electric field to a pixel in response to a gate signal, electrodes (not shown) of source, drain, and gate of TFTs 34, matrix lines (not shown) constituted by gate (scan) lines and signal lines connected to TFTs 34, and pixel electrodes 35 connected to TFTs 34. An orientation film 36 is formed on these elements, the film subjected to the orientation process (rubbing process and the like).

A common electrode 37 is formed on the upper glass substrate 33 shown in FIG. 3. Another orientation film subjected to the orientation process is formed at the interface between the common electrode 37 and liquid crystal layer 31. The upper and lower glass substrates 33 and 32 are disposed with their orientations being perpendicular to each other.

In some cases, there are formed color filter layers (not shown) and a light shielding film (not shown) called a black mask for improving the contrast of an image by preventing light from being transmitted through the area other than the pixel area.

The liquid crystal layer 31 shown in FIG. 3 is a twist nematic type liquid crystal layer. Because the orientation films 36 and 38 were subjected to the rubbing process to make their orientations perpendicular to each other by 90 degrees, when an electric field is not applied between these electrodes as indicated at (A) of FIG. 3, the longitudinal axes of the liquid crystal molecules 30 are orientated generally perpendicular to the optical axis 0X, the longitudinal axes being twisted by 90 degrees in the range between the pixel electrode 35 and common electrode 37. Under this condition indicated at (A) in FIG. 3, when a linearly polarized light having a vertical polarization relative to the surface of the drawing sheet of FIG. 3 becomes incident to the liquid crystal layer 31 from under the glass substrate 32 along the optical axis 0X, the incident light is twisted by 90 degrees and is outputted from the glass substrate 33. This outputted light transmits through a polarizer (not shown) having a polarization axis perpendicular to that at the light incident side, to provide a bright state.

When an electric field is applied between the pixel electrode 35 and common electrode 37 sandwiching the liquid crystal layer 31, the liquid crystal molecules 30 are orientated all in the optical axis direction as indicated at (B) of FIG. 3. Therefore, the incident linearly polarized light passes through the liquid crystal layer 31 without being twisted, and intercepted by the polarizer having the polarization axis perpendicular to that on the light incident side, to provide a dark state.

A conventional method of manufacturing such twist nematic liquid crystal displays is as follows.

First, TFTs 34, matrix lines (not shown) constituted by signal lines and scan lines, and pixel electrodes 35 are formed on the glass substrate 32 and interconnected to make a TFT substrate.

Next, a common electrode 37 is formed on the other glass substrate 33 to make a common electrode substrate. Orientation films 36 and 38 fare formed on the TFT substrate and common electrode substrate and are subjected to the rubbing process.

The substrates are mounted on a gap regulator (not shown) interposed therebetween, while positioning the substrates so as to obtain an orientation difference of 90 degrees between the orientation films 36 and 38. Nematic liquid crystal is filled in between the substrates via an inlet port which is thereafter sealed to obtain a finished liquid crystal display.

The above-described manufacturing method is basically applicable also when using metal-insulator-metal (MIM) diodes instead of TFTs for the control of an active matrix display.

With the above-described manufacturing method, static electricity may generate during the rubbing process for orientation films. This static electricity may cause short-circuits between TFTs or MIM diodes, breakage of lines, destruction of TFTs, or characteristic changes, resulting in possible dot detects or line defects.

Very thin insulating films in the order of 200 to 600 nm are used to electrically insulate between electrodes of TFT or MIM elements and between matrix lines including signal and gate lines. The dielectric breakdown of such thin films may be caused by static electricity. Because amorphous silicon or polysilicon semiconductors are used as TFT material, the characteristics of transistors such as threshold values may change when a high electric field concentrates on electrodes.

SUMMARY OF THE INVENTION

It is an object of the present invention to provide a liquid crystal display capable of reducing dot or line defects by eliminating destruction of elements on substrates, short-circuits between electrodes, and breakage of lines, respectively to be caused by the manufacturing process, especially by static electricity generated during the rubbing process in the orientation film forming step.

According to one aspect of a liquid crystal display of the present invention, only one of two substrates formed with a common electrode is formed with an orientation film subjected to the rubbing process. The other substrate formed with driving elements and electrode lines, or formed with segment electrodes, is not formed with an orientation film.

Orientation of liquid crystal molecules is set using a thermo-optical effect of liquid crystal. Nematic liquid crystal heated to a particular temperature or higher becomes isotropic. This phase transition temperature is called an N-I temperature. The orientation direction of liquid crystal molecules is aligned by injecting liquid crystal material heated to the phase transistor temperature or higher and given an isotropic phase, into liquid crystal cells heated to the same temperature, and thereafter gradually cooling cells to transit the liquid crystal material phase to the nematic liquid crystal phase.

A method of manufacturing a liquid crystal display, includes the steps of: forming driving elements, pixel electrodes connected to the driving elements, and electrode lines connected to the driving elements, respectively on the surface of a first substrate; forming a common electrode on the surface of a second substrate; forming an orientation film on the common electrode on the second substrate and performing a rubbing process on the orientation film; disposing the first and second substrates facing each other and spaced by a predetermined distance, and injecting a liquid of liquid crystal material in an isotropic phase heated to the phase transition temperature (N-I temperature) or higher in between the first and second substrates; and gradually cooling the liquid to transit the phase of the liquid from the isotropic phase to the nematic liquid crystal phase.

Another method of manufacturing a liquid crystal display, includes the steps of: forming segment electrodes on the surface of a first substrate; forming a common electrode on the surface of a second substrate; forming an orientation film on the common electrode on the second substrate and performing a rubbing procession the orientation film; disposing the first and second substrates facing each other and spaced by a predetermined distance, and injecting a liquid of liquid crystal material in an isotropic phase heated to the phase transition temperature or higher in between the first and second substrates; and gradually cooling the liquid to transit the phase of the liquid from the isotropic phase to the nematic liquid crystal phase.

A rubbing process is not performed for a substrate susceptible to the influence of static electricity, such as a substrate formed with driving elements and electrode lines, a substrate formed with segment electrode thinner than the common electrode. Therefore, static electricity has no concern with this substrate. The other substrate is formed with an orientation film subjected to the rubbing process. This substrate formed with the common electrode has relatively high tolerance against static electricity.

Orientation of liquid crystal molecules is set using a thermo-optical effect of liquid crystal. More in particular, when a liquid of liquid crystal material heated to the phase transition temperature (N-I temperature) or higher and injected in between the substrates, the orientation of liquid molecules is random and isotopic without giving a nematic liquid crystal phase. When the liquid is gradually cooled thereafter, the phase changes from the isotropic phase to the nematic liquid crystal phase, and during this slow cooling process, liquid crystal molecules are orientated in the orientation direction of the substrate.

According to the liquid crystal display manufacturing method of the present invention, only one of the substrates formed with the command electrode is formed with an orientation film subjected to the rubbing process, and the other substrate formed with driving elements and electrode lines, or with segment electrodes, is not subjected to the orientation process. The orientation direction of liquid crystal molecules is aligned starting on the side of the substrate with the orientation film, after injecting liquid crystal material heated to the phase transistor temperature or higher and given an isotropic phase, in between the substrates, and thereafter gradually cooling the liquid crystal material to transit to the nematic liquid crystal phase.

A rubbing process is not performed for a substrate susceptible to the influence of static electricity, such as a substrate formed with driving elements and electrode lines, or with segment electrode thinner than the common electrode. Therefore, static electricity has no concern with this substrate.

The other substrate is formed with an orientation film subjected to the rubbing process. Therefore, the number of steps of manufacturing a liquid crystal display can be reduced. The reduced number of rubbing processes also reduces defects such as gaps, black dots, or white dots to be caused by dusts produced during the rubbing process.

DETAILED DESCRIPTION OF THE PREFERRED EMBODIMENTS

Figure 1:
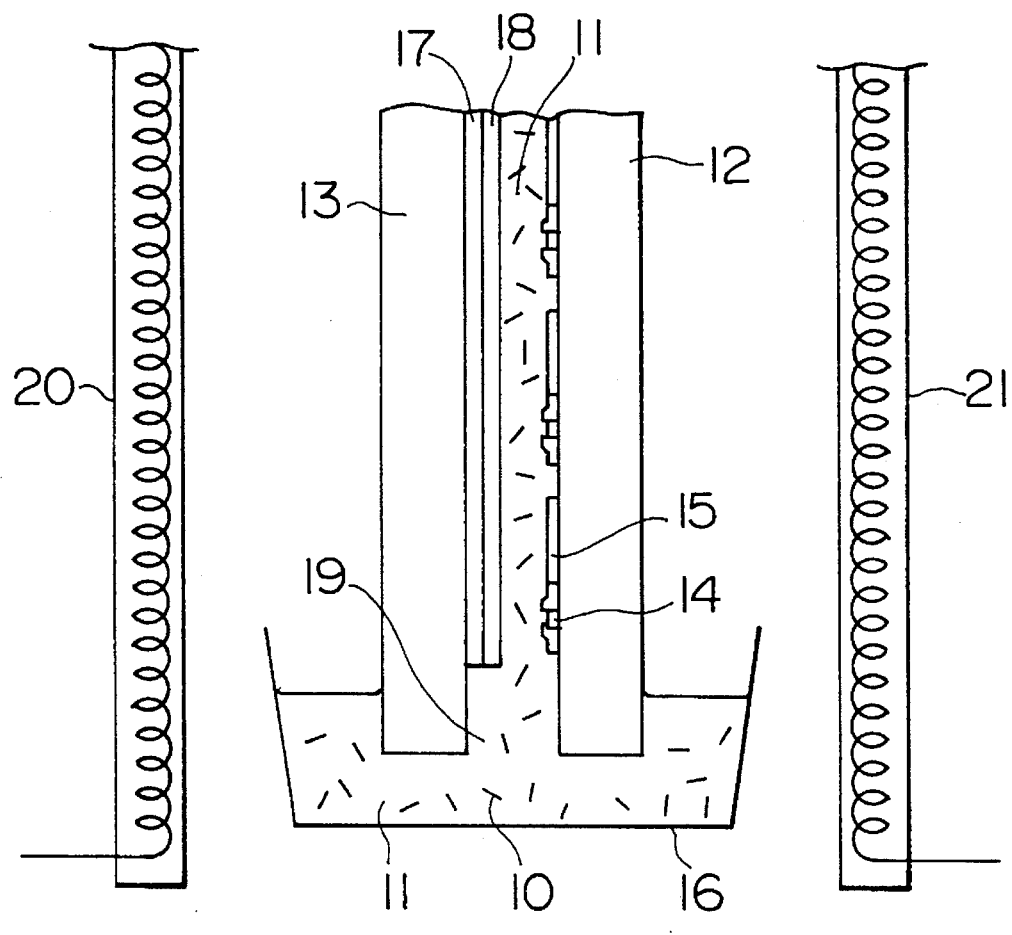
FIG. 1 is a diagram explaining a method of manufacturing liquid crystal displays according to a first embodiment of the present invention.

A first embodiment of a method of manufacturing liquid crystal displays according to the present invention will be described with reference to FIG. 1. FIG. 1 is a conceptual diagram illustrating a method of manufacturing twist nematic type liquid crystal displays.

Referring to FIG. 1, formed on a transparent glass substrate 12 are TFTs 14 for applying an electric field to a pixel in response to a gate signal, electrode lines (not shown) of source, drain, and gate of TFTs, and pixel electrodes 15 connected to TFTs 14. An orientation film is not formed on this glass substrate 12. TFTs are made of amorphous silicon or polysilicon, and insulating films such as a gate insulating film are made of silicon oxide, silicon nitride, aluminum oxide, aluminum nitride, or the like. Each electrode line is made of metal such as chrome, aluminum, or the like.

A common electrode 17 is formed on the other transparent glass substrate 13 shown in FIG. 1. An orientation film 18 made of polyimide or the like is formed at the interface between the common electrode 17 and liquid crystal layer 11, and is subjected to a rubbing process to provide orientation. In some cases, there are formed color filter layers (not shown) and a light shielding film (not shown) called a black mask made of organic resin added with black dye or the like, for improving the contrast of an image by preventing light from transmitting through the area other than the pixel display area.

The two substrates may be manufactured using a conventional substrate manufacturing technique. The pixel electrode substrate is not formed with an orientation film, and hence without an orientation process.

The substrates 12 and 13 are mounted facing each other on a gap regulator such as glass balls (not shown) interposed therebetween, and fixed on the ends of an adhesive layer formed at the peripheral portion of the two facing substrates. An inject port 19 is formed in the adhesive layer.

Next, as shown in FIG. 1, the inlet port 19 is immersed in a container 16 filled with liquid crystal material 11 which is guided in between the two substrates 12 and 13 by using surface tension or vacuum suction. The liquid crystal material 11 is a mixed liquid of nematic liquid crystal material and chiral molecules. The nematic liquid crystal material may be ZLI-2392 manufactured by Merck (Germany) or SR-5003 manufactured by Chisso (Japan).

The liquid crystal material 11 is then heated by heaters 20 and 21 installed on both sides of the liquid crystal display. The temperature of the liquid crystal material 11 is raised to the phase transition temperature (N-I temperature) or higher. The orientation of liquid crystal molecules 10 of the material 11 is therefore random and isotropic.

For the temperature control of liquid crystal, a temperature control technique may be used in which the temperature of the liquid crystal material 11 is monitored by a thermometer dipped in the material 11 to regulate the current amount to the heaters 20 and 21. The temperature control may be made manually or automatically.

The heated liquid crystal material 11 is guided into a gap between the substrates 12 and 13 via the inlet port 19 because of the capillary action. Under this condition, the liquid crystal molecules 10 are isotropic and not orientated. The liquid crystal material 11 may be injected by using other methods not using the capillary action.

After the injection of the liquid crystal material, the calorific amount of the heaters 20 and 21 is lowered to gradually cool the liquid crystal material 11. The cooling speed is set within the range of 0.1 to 10° C./min., for example, 0.5° C./min. It has been found that nematic liquid crystal is orientated relatively uniformly even at a low cooling speed. As the liquid crystal material 11 is gradually cooled at such a cooling speed down to the phase transition temperature (N-I temperature), the isotropic phase (I) at the initial condition changes to the nematic liquid crystal phase (N).

During the slow cooling process, liquid crystal molecules 10 near the orientation film 18 on the glass substrate are orientated in the orientation direction of the orientation film 18, and liquid crystal molecules 10 near the opposite glass substrate 12 are random. However, because off the low cooling speed, the liquid crystal molecules near the glass substrate 12 are also orientated gradually to the orientation direction, and finally all the liquid crystal molecules are orientated in the same direction.

Chiral molecules ape contained in the liquid crystal material 11 so that the liquid crystal molecules 10 are twisted in a predetermined direction during the cooling process to provide a spiral structure in the optical axis direction. By properly adjusting the contents of chiral molecules and the gap between the substrates, it is possible to provide a liquid crystal display having a twist angle of 90 degrees. Examples of the liquid crystal material are shown in Table 1.

TABLE 1

| Product Name | N-I Temperature | Maker |
| --- | --- | --- |
| ZLI-2392 | +105° C. | Merck (Germany) |
| SR-5003 | +99° C. | Chisso (Japan) |

As chiral material, S-811 manufactured by Merck, for example, is mixed about 0.5 wt % to set d/p=¼ (where d is a thickness of the liquid crystal layer, and p is a chiral pitch). The chiral pitch about 24 μm was obtained, and the twist angle of 90 degrees was obtained at the liquid crystal layer thickness about 6 μm.

Figure 2:
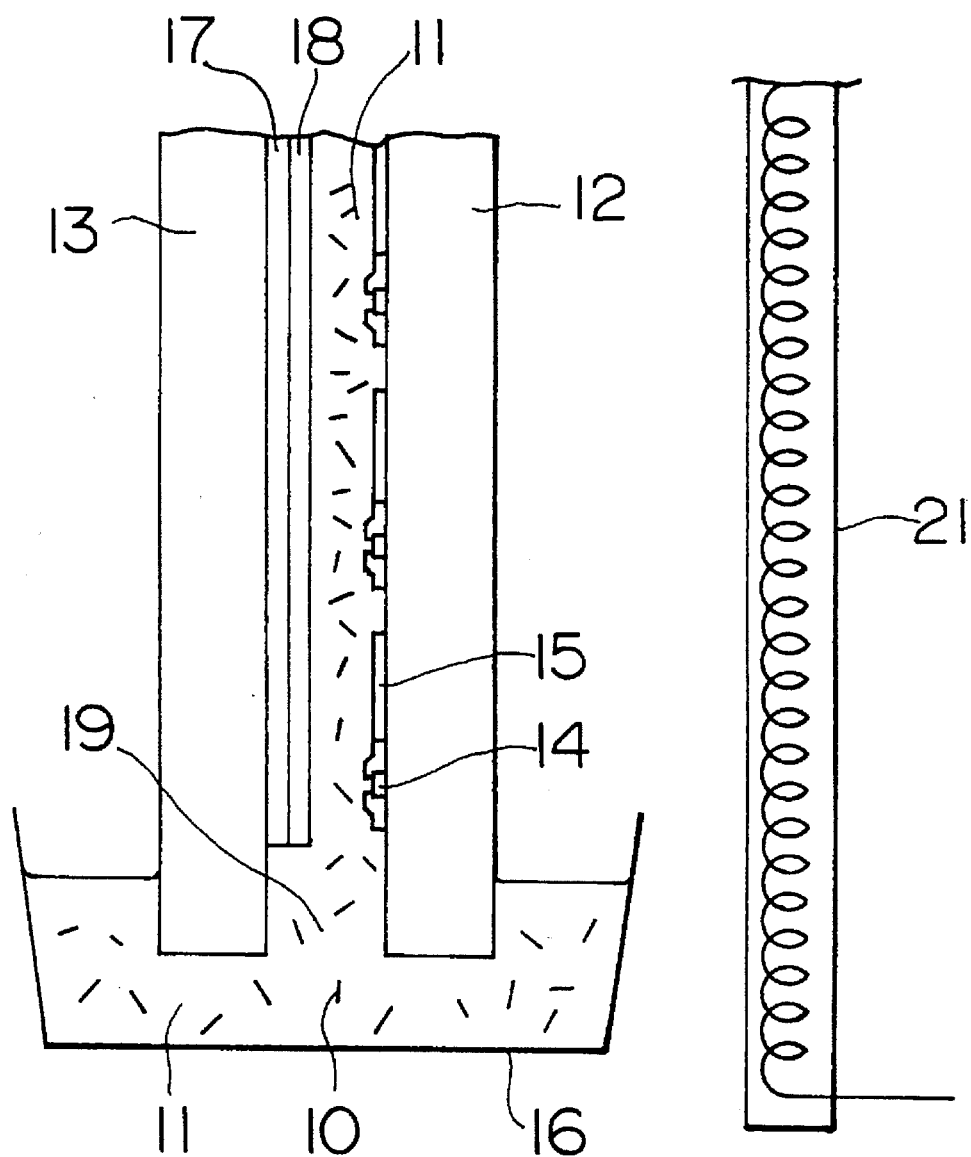
FIG. 2 is a diagram explaining a method of manufacturing liquid crystal displays according to a second embodiment of the present invention.
Figure 3:
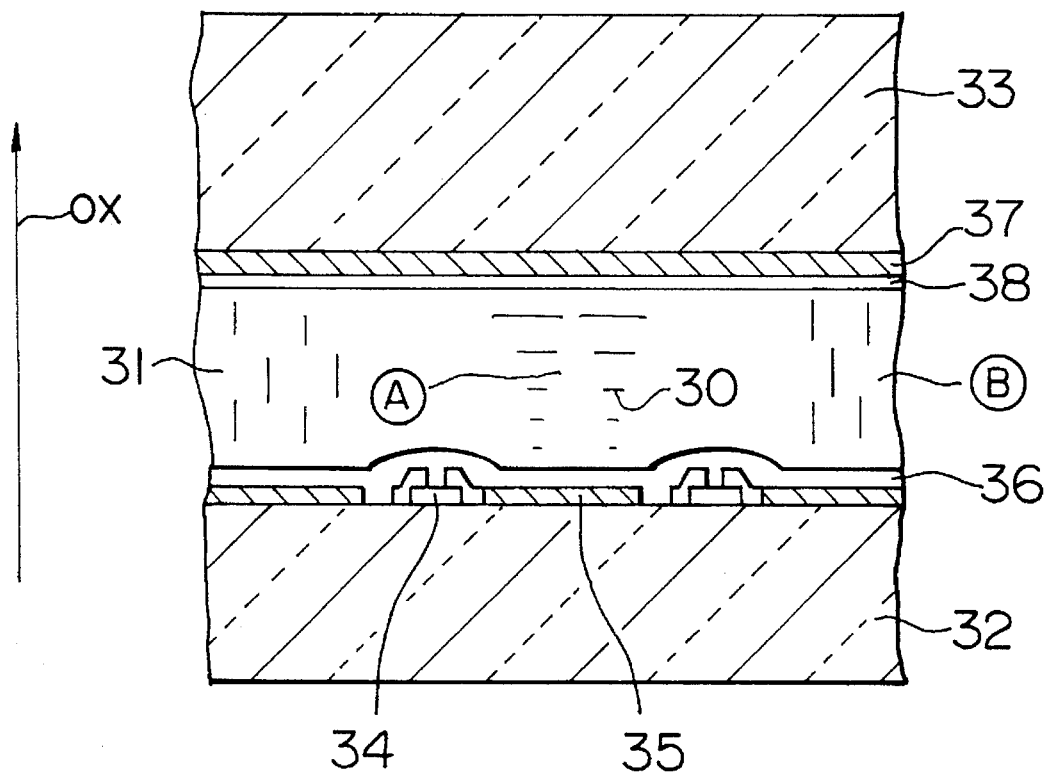
FIG. 3 is a cross sectional view of a liquid crystal display manufactured by a conventional technique.

Next, the second embodiment of a method of manufacturing liquid crystal displays according to the present invention will be described with reference to FIG. 2. FIG. 2 is a conceptual diagram illustrating a method of manufacturing twist nematic type liquid crystal displays.

Like elements to those shown in FIG. 1 are designated by using identical reference numerals in FIG. 2. The substrates 12 and 13 of a liquid crystal display are basically the same as those of the first embodiment. In the following description, mainly the different points from the first embodiment manufacturing method illustrated in FIG. 1, will be discussed.

The different point of the embodiment shown in FIG. 2 from the embodiment shown in FIG. 1 resides in that a heater 20 on the side of the glass substrate 13 with the common electrode 17 is omitted. Positively using this difference, there is provided in the second embodiment a temperature gradient in the liquid crystal material between the substrates during the cooling process after heating the liquid crystal material 11.

In the second embodiment, the same processes are carried out up to the process of heating the liquid crystal material 11 to the phase transition temperature or higher. Although only one heater 21 is used, there is no substantial difference between the first and second embodiments in the context of heating the whole liquid crystal display to the N-I temperature or higher. The liquid crystal material 11 is gradually cooled while providing a temperature gradient in the material 11 between the glass substrates 12 and 13.

More in particular, the liquid crystal material 11 is gradually cooled while maintaining the liquid crystal temperature on the side of the glass substrate 12 with TFTs higher by several degrees to several tens degrees °C. than that on the side of the glass substrate 13 with the common electrode 13.

With such a temperature gradient, the liquid crystal material on the side of the common electrode substrate 13 first reaches the N-I temperature, and then the liquid crystal material on the side of the TFT substrate gradually reaches the N-I temperature. Since the substrate 13 has an orientation structure, the liquid crystal material is gradually orientated starting from the substrate 13 side and becomes nematic.

The manufacturing method of the present invention is applicable to both simple matrix type and active matrix type liquid crystal displays. The method of the present invention is particularly effective for eliminating the influence of static electricity to TFT driving elements of an active matrix type.

The invention is also applicable to liquid crystal displays using driving elements of either TFTs or MIM diodes, and to liquid crystal displays other than TN type.

For simple matrix type liquid crystal displays, the orientation structure is provided to the substrate having a relatively thick common electrode, and not provided to the substrate having a relatively thin segment electrode, thereby effectively reducing failures to be caused by static electricity.

The temperature gradient may be controlled in an enhanced manner by using a heater on one side of the substrates and a heat radiator or cooler on the other side of the substrates.

Furthermore, an orientation film such as a polyimide film may be formed on the TFT substrate to use it as a passivation film or the like, without performing the rubbing process to thereby remove the influence of static electricity.

The structures, materials, values, and the like of the embodiments described above are only for the illustrative purpose and are not intended to limit the scope of the present invention. It is apparent from those skilled in the art that various modifications, improvements, combinations, and the like are possible.

We claim:

1. A method of manufacturing a liquid crystal display, comprising the steps of:

forming a first electrode structure on a first substrate;

forming a second electrode structure on a second substrate;

forming an orientation film on said second electrode structure; and then rubbing said orientation film on said second substrate, wherein said first substrate does not have an orientation film;

disposing said first substrate and said second substrate to face each other and to be spaced apart from each other by a predetermined distance; and injecting a liquid including a liquid crystal material that is in an isotropic phase thereof between said first and second substrates;

said liquid crystal material being brought to said isotropic phase thereof by heating said liquid crystal material at least to a transition temperature thereof;

gradually cooling said liquid crystal material until a phase change of said liquid crystal material occurs from the isotropic phase thereof to a nematic liquid crystal phase thereof; and wherein said step of gradually cooling said liquid crystal material, comprises cooling said liquid crystal material in a direction from the second substrate toward said first substrate.

2. A method according to claim 1, wherein said step of forming said first electrode structure on said first substrate includes forming on a surface of said first substrate;

a plurality of driving elements;

a plurality of pixel elements, each pixel element being connected to one of said driving element; and a plurality of electrode lines respectively connected to one of said driving elements.

3. A method according to claim 2, wherein said step of forming said second electrode structure on said second substrate includes a step of forming a common electrode on a surface of said second substrate.

4. A method according to claim 1, wherein:

said step of forming said first electrode structure on said first substrate includes:

forming segment electrodes on a surface of said first substrate; and said step of forming said second electrode structure on said second substrate includes forming a common electrode on a surface of said second substrate.

5. A method according to claim 1, wherein said injecting step includes adding chiral molecules to said liquid crystal material.

6. A method of manufacturing a liquid crystal display, comprising the steps of:

forming a first electrode structure on a first substrate;

forming a second electrode structure on a second substrate;

forming an orientation film on said second electrode structure; and then rubbing said orientation film on said second substrate, wherein said first substrate does not have an orientation film;

disposing said first substrate and said second substrate to face each other and to be spaced apart from each other by a predetermined distance;

injecting a liquid including a liquid crystal material between the first and second substrates;

heating the liquid crystal material injected between said first and second substrates to at least a transition temperature of said liquid crystal material so that said liquid crystal material is in an isotropic phase thereof; and gradually cooling said liquid crystal material until a phase change of said liquid crystal material occurs from the isotropic phase thereof to a nematic liquid crystal phase thereof;

wherein said step of forming said first electrode structure on said first substrate includes forming on a surface of said first substrate:

a plurality of driving elements;

a plurality of pixel elements, each pixel element being connected to one of said driving elements; and a plurality of electrode lines respectively connected to one of said driving elements; and wherein said step of gradually cooling said liquid crystal material, comprises cooling said liquid crystal material in a direction from the second substrate toward said first substrate.

* * * * *